Figure 1:
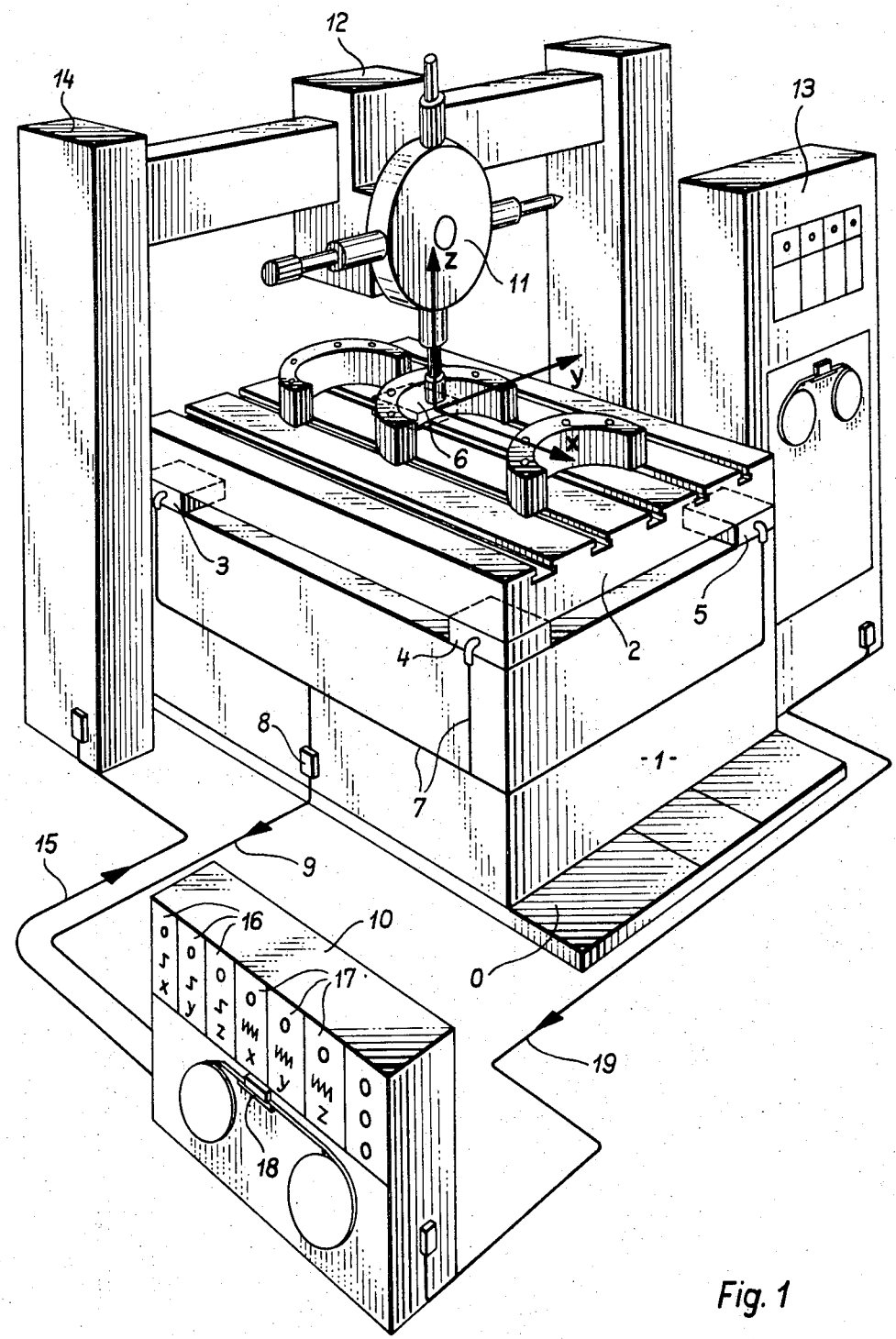

United States Patent [19]
Sonderegger

[11] 3,809,488
[45] May 7, 1974

[54] SUPERVISORY EQUIPMENT FOR MACHINE TOOLS

[75] Inventor: Hans C. Sonderegger, 8413 Neftenbach, Switzerland

[73] Assignee: Kistler Instrumente AG, Winterthur, Switzerland

[22] Filed: Aug. 8, 1969

[21] Appl. No.: 848,416

[30] Foreign Application Priority Data
Aug. 8, 1968  Switzerland.................... 12109/68

[52] U.S. Cl............................ 408/6, 408/8, 408/25, 318/460, 318/566, 318/646
[51] Int. Cl............................................. B23b 39/00
[58] Field of Search .......... 318/563, 666, 460, 566, 318/646; 77/1, 5.2; 82/DIG. 9, 34; 29/26, 568; 90/1.6 R; 408/6, 8, 25

[56] References Cited
UNITED STATES PATENTS

| | | | |
|---|---|---|---|
| 2,997,901 | 8/1961 | Keck et al. | 77/5.2 UX |
| 3,095,532 | 6/1963 | Floyd | 318/460 |
| 3,138,750 | 6/1964 | Borger et al. | 318/563 |
| 3,504,581 | 4/1970 | Weichbrodt et al. | 77/1 X |
| 2,790,340 | 4/1957 | Cross | 77/5.2 |
| 3,149,488 | 9/1964 | Castro | 73/141 |
| 3,186,217 | 6/1965 | Pfann | 73/88.5 |
| 3,548,172 | 12/1970 | Centner et al. | 77/5 X |
| 3,522,757 | 8/1970 | Lohrer | 90/1.6 X |
| 2,498,881 | 2/1950 | Eldridge Jr. | 82/34 X |

Primary Examiner—Andrew R. Juhasz
Assistant Examiner—Z. R. Bilinsky
Attorney, Agent, or Firm—Craig & Antonelli

[57] ABSTRACT

A supervisory equipment for automated machine tools, in which certain machining effects on the tool and/or workpiece are determined by sensor devices, and in which the thus sensed and determined values are compared with predetermined values in the course of the cycle of operation to produce a control signal or signals in the event a sensed value exceeds a predetermined value.

5 Claims, 7 Drawing Figures

Inventor:
HANS CONRAD SONDEREGGER

Inventor:
HANS CONRAD SONDEREGGER

BY
Craig, Antonelli, Stewart & Hill
Attorneys

SUPERVISORY EQUIPMENT FOR MACHINE TOOLS

The present invention relates to a supervisory device for machine tools, especially automatic machine tools, numerically controlled tools and the like.

As is known the developments in all branches of the machine tool sector lead in the direction towards automation of production, and automatic lathes, for example, have been available for many years. With such automatic lathes the individual operations are controlled by mechanical step-by-step drives, and a considerable number of operations can then be preformed in controlled sequence. The individual tool holders are operated by cams and cooperate with adjustable stops. As a result of elasticity considerations and the effects of wear, the accuracies obtainable with such mechanically controlled machines are limited to certain extents.

Recent developments which have taken place in particular during the last 10 years utilize fully electronic measuring and control means. The tool movement with such machines is generally controlled in several coordinates for which purpose a completely electronic measurement of the movement executed by the tool carrier is necessary. Such movement measurements can be carried out today on machines operating on a coordinate system for movements of more than 1 meter with an accurdacy of 0.001 mm, that is to say, the resolution of the whole measuring system must have a value of at least $1:10^7$. This high accuracy requires very substantial technical complications and today the electronic control of a machine tool occupies practically as much space as the machine itself but the cost amounts to a multiple of that of the machine tool. However, the production capacity of such machines is increased correspondingly to the high capital investment. A wide range of operations like boring, milling, turning, die sinking, grinding, etc., can be carried out on fully automatic multiple purpose machines and up to 200 and more different tools can be brought into use.

Generally the workpiece is finished machined on the same machine with automatically effected clamping and re-positioning. The operating personnel has merely the function of supervision, especially when tool wear becomes noticeable due to vibration or unsatisfactory surface production or low tolerances. As a result of this necessary supervision the operation of the machines themselves is no cheaper as compared with the conditions without electronic control means. On the other hand, it has been shown that an automatically controlled machine involves greater tool wear than a machine operated by a skilled operator. This is due simply to the fact that the operating speeds of automatic machines follow a preset cycle in which the progressive wear of the tool is not taken into account in any way.

If the problem of chip formation of tools is closely investigated, it is found that a wide range of operating conditions is available between that for the newly ground tool and a tool which is no longer suitable for operation due to progressive wear of the tool edge. From a definite point onwards the reaction forces on the tool commence to increase rapidly, accompanied by a corresponding rise in temperature of the workpiece and of the tool. This is associated with a lowering of the tolerances caused by elastic deformation of the workpiece and of the tool holder as well as also by thermal expansion of the workpiece. An automated machine tool cannot, however, respond to these varying tool effects since the electronic control of the machine when once selected cannot take into account the aforesaid progressive changes.

The invention is directed to transferring the supervision of the automated finishing operations to a special supervisory unit. The invention thus relates to a supervisory unit for machine tools responding to significant mechanical forces resulting from the machining operation transmitted to the workpiece or on the tool, such as forces, torques, vibrations or accelerations. The invention is characterized by sensors for continuously determining such machanical factors in various components as well as by an electronic comparison and control unit which on exceeding predetermined acceptable maximum values of the components of the values being determined, gives a control signal for stopping the work operation.

With such a supervisory unit in accordance with the invention the final step in the field of automation of machine tools is provided in that not only is there a fully automatic control of the machine but also a corresponding continuous supervision thereof becomes possible.

Figure 2:
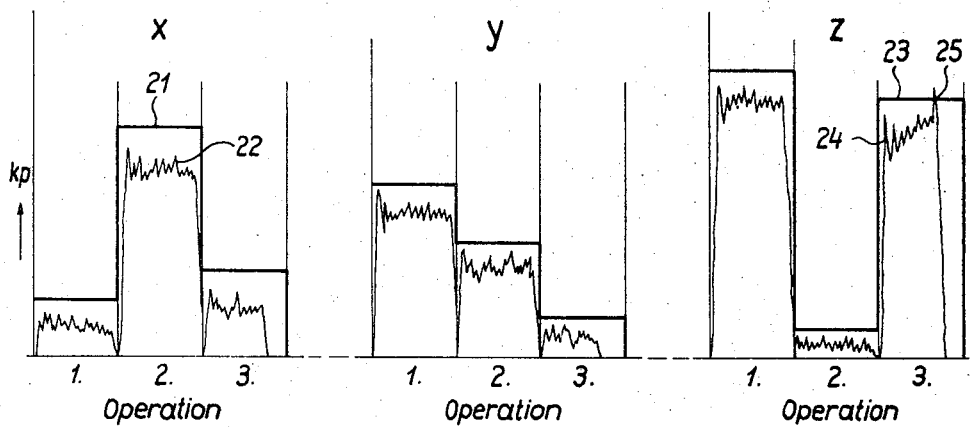
Figure 3:
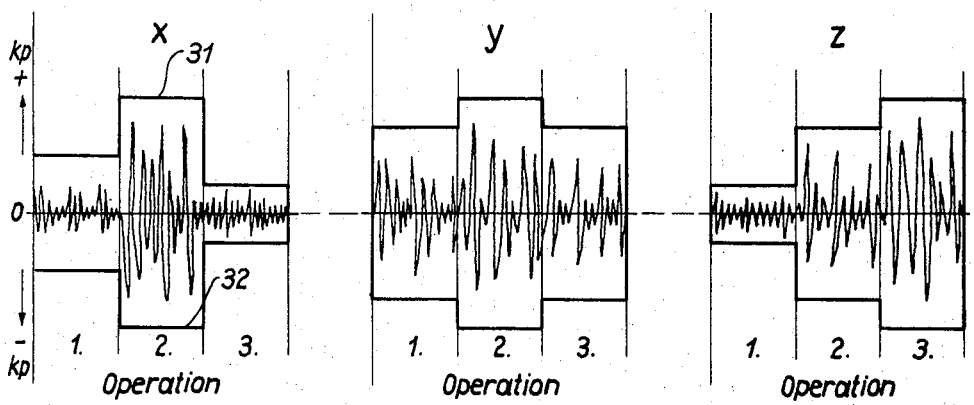
Figure 4:
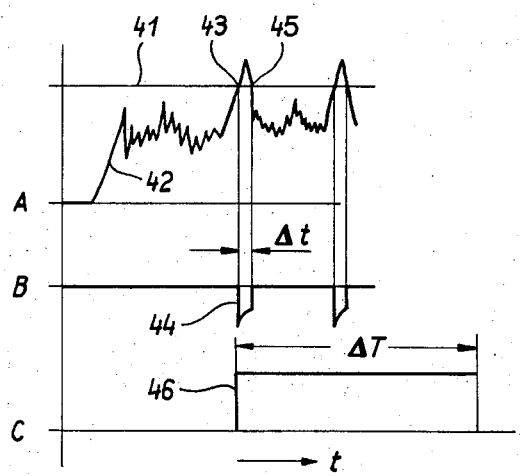
Figure 5:
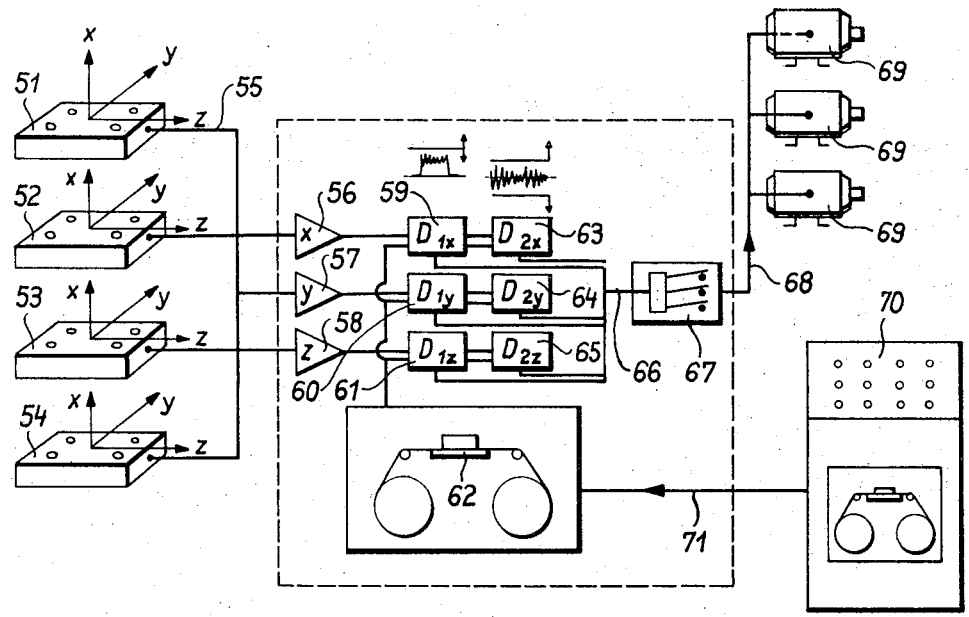
Figure 6:
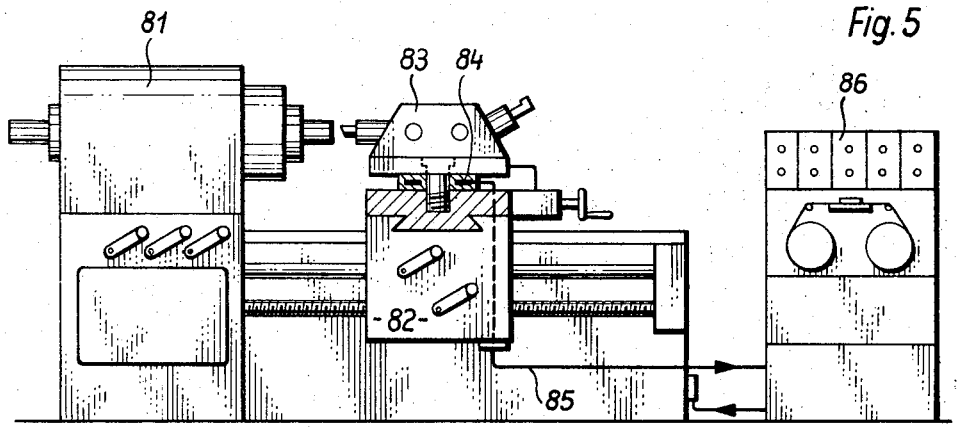
Figure 7:
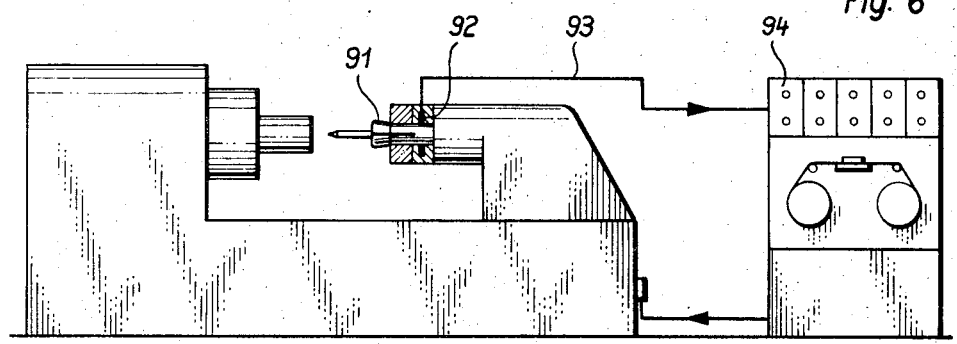

Constructional examples of the invention are explained below on the basis of the drawings in which:

FIG. 1 shows in perspective an electronically controlled multipurpose machine tool which cooperates with the supervisory unit according to the invention, FIG. 2 shows standard and actual value diagrams for the forces in three different coordinates, FIG. 3 shows standard and actual value diagrams for vibrations in three coordinates, FIG. 4 shows a supervisory procedure with the associated control diagrams, FIG. 5 shows a supervisory unit according to the invention in the form of a block diagram, FIG. 6 shows a supervisory unit which cooperates with an automatic turret lathe, and FIG. 7 shows an automatic supervisory unit for an automatic bar lathe.

The multipurpose machine tool shown in FIG. 1 operates on a three-coordinate system. It consists of a base plate 0 on which a support 1 is mounted and a work table 2 which is mounted on the support 1. The support 1 may consist of a slide movable on the base plate 0 or it can be fixed to the base plate. Multiple component force sensors 3, 4, 5 and 6 are clamped under mechanical pre-stressing between the support 1 and the work table 2. The construction of these multiple component force sensors is such that they are as flat and rigid as possible so that spring effects resulting from the work forces do not have to be taken into account.

Such multiple component force measuring elements are advantageously produced with piezo crystals which embody various sensitivity directions. Quartz crystals in particular have properties of elasticity and mechanical stiffness which correspond to those of metals and hence it is possible to produce transducers which are extremely flat and sensitive to several components and moreover permit a satisfactory differentiation of the various components. It is particularly important that such measuring elements can be as stiff as metal plates and moreover have a resolution factor of better than $1:10^6$. Furthermore, they can be calibrated statically and are reliable in view of their simple construction.

The natural frequency of the table can be chosen according to the size of the work table 2 and the number of force measuring elements provided. Natural frequencies of such arrangements of well above 100 Hz can be easily attained. In this way it is possible to measure satisfactorily chatter effects or natural vibrations at frequencies of more than 100 Hz.

The measurement transducers 3, 4, 5 and 6 are connected through connecting lines 7 to a junction box 8 from which a flexible cable connection 9 leads to an electronic comparison and control panel 10. The movements of the machine tool head 11 and of the cross slide 12 as well as the support 1 or the work table 2 are controlled by the central control unit 13. This is also connected to the comparison and control panel 10 by means of a cable 19 in the case of a completely automatic supervisory system.

For a semi-automatic supervisory system only one set of maximum values may be entered into the panel 10 for all the work operations. The continuous supervision then takes into account only these maximum values which are determined as acceptable for the various components. In all cases however the panel 10 is connected to the machine tool 14 by the cable 15 so that it can act immediately while machining is in progress.

Signals emitted from the control panel 10 may be used to stop the machine tool in the event of excessive forces, vibrations or chatter being sensed by the sensors or transducers 3, 4, 5 and 6. Alternatively signals emitted from the control panel 10 may be utilized to bring a new tool into the operative position, and in some cases this operation may be deferred until the machining operation then in progress is completed so that the new tool becomes effective for the next following workpiece.

The panel 10 comprises individual supervisory units 16 for the force components X, Y and Z and corresponding units 17 for the vibration components X, Y and Z. Obviously, it lies within the scope of the invention for the equipment to be limited only to force or only to vibration components. It is of course also possible to supervise other components than those mentioned. Experience has however shown that conveniently both the maximum forces in the various components and also the maximum amplitudes of the vibrations must be taken into account.

Objectionable chatter can for example occur with workpieces of resilient material and thin walls even when relatively small machining forces are present. On the other hand, it must also be taken into account that chatter can occur in a roughing operation without damaging the workpiece. During the finishing operation, however, all chatter must be prevented. As a result of these various requirements resulting from roughing and finishing operations, it will be seen that for a satisfactory supervisory device the permissible force and vibration components must be separately assessed for each working operation and furthermore separately for the various component directions. The panel 10 is equipped for this purpose with a conventional program storage device 18 in which the maximum standard values for the force and vibration components for each operation are stored. The storage device 18 is controlled by the connecting cable 19 from the central control device 13. Instead of force and vibration components, however, other forces such as torques, accelerations, bending moments and so on can be supervised, assuming of course that in each case corresponding sensors are used.

FIG. 2 shows diagrams illustrating the use of the storage means 18 in FIG. 1. The line 21 represents, for example, the maximum standard value for the force components in the X direction in respect of the second operation. The line 22 represents the corresponding actual value which must be supervised in operation. The standard value has not been exceeded. In the diagram marked Z the line 23 represents the permissible standard value for the Z-component, the actual-value curve 24 has however exceeded the standard value at the point 25; this shows that the third operation should be immediately stopped by emitting a control signal which can be achieved by well known, conventional means.

In FIG. 3 the vibration amplitudes are shown for three components. For this supervision preferably the so-called peak values, that is to say, the positive and negative peaks are used. The envelope 31, 32 is thus symmetrical to the axis of the diagram and represents standard peak values. There is no essential coordination between the amplitudes of the maximum vibrations and those of the maximum forces according to FIG. 2, as has already been explained. The two systems must therefore operate completely separately. FIGS. 2 and 3 show in each case three operations for each component. Obviously this number may be substantially exceeded and the machining times of the individual operations may be greatly different from one another.

FIG. 4 shows a supervisory procedure wherein the line 41 represents the selected standard amplitude while the curve 42 represents the measured actual value of the force in a definite component. At the point 43 the standard value is exceeded so that an initiating pulse 44 is produced by conventional means, which is maintained until the actual value at the point 45 again falls below the standard value. The very short trigger signal 44 so produced initiates the control signal 46 which is maintained independently of the pulse width $\Delta t$ for a definite operating period $\Delta T$. This operating period $\Delta T$ is determined by the method of operation of the relay in the machine tool which is required for interrupting the machining operation.

FIG. 5 is a block circuit diagram of supervisory equipment according to the invention. The multiple component force sensors shown in FIG. 1 are indicated at 51, 52, 53, 54, these elements consisting of flat components. The elements are connected together by means of a multiple cable 55 so that all the X-components are in parallel the same applying to the Y- and Z-components. The three individual components are then fed to amplifiers 56, 57 and 58 which supply corresponding measurement signals to the discriminators 59, 60, 61. This provides the actual value signals. The standard values are derived from a storage device 62 both for the force discriminators 59, 60 and 61 and for the vibration discriminators 63, 64 and 65. The control signals of both discriminator groups are fed together through a conductor 66 to the relay station 67 which is connected through a lead 68 to the various driving motors 69 for the machine tool. The central control device 70 feeds the operational sequence to the storage device 62 by means of a conductor 71. The signal storage may as indicated consist of a magnetic tape system which is advanced step-by-step under the control of the central control device as the latter is operated to cause the machine tool to perform successive machining operations.

FIG. 6 shows a further modification of the subject matter of the invention for an automatic lathe in which 81 represents the drive and bearing assembly for the spindle, 82 the displaceable tool slide, and 83 a turret head mounted on the tool slide. A multiple component force measuring cell 84 is mounted between the turret and the tool slide under mechanical pre-stressing and is connected to the supervisory control device 86 of the supervisory plant by means of the conductor 85.

FIG. 7 shows a further arrangement as applied to an automatic bar lathe in which 91 represents the tool head and 92 is a disc-shaped measuring cell which can measure both torque forces and also axial forces and transmits these values to the supervisory control device 94. Similar arrangements could be adopted for a range of other machine tools such as drilling and boring machines, broaching machines, grinding machines, fully automatic presses, punching machines and the like.

The invention thus permits a further important step in the development of automatic machine tools by which the supervision of the machine is made completely automatic. Only in this way is it possible to make full use of the great advantages of the electronic control of machine tools. The invention demonstrates the means and possibilities by which the individual stages of a complicated machining operation can be continuously supervised. The standard values of permissible force and vibration amplitudes may be determined if desired on the basis of tests in which the actual values are measured and the necessary safety margins determined and stored, for example, on the magnetic tape device 62. Besides the values of forces and vibrations, also the frequencies of the vibrations, of torque effects, of flexure effects, accelerations and so on can be analyzed and supervised. It is also possible for the degree of automation of the supervision to be adapted to the degree of automation in the control of the machine tool. Thus, for example, only certain significant operations can be automatically and selectively supervised whereas other simpler operations not likely to lead to significant difficulties can be supervised in groups by definite fixed values.

The invention is not limited to any particular type of embodiment or application or any particular type of sensor. It is also possible to use sensors of other types, for example, those based on the use of piezo-resistive elements or elements constructed in the same way as strain gauge strips. What is important is that the sensors shall be incorporated in the machine tool in such manner that the operating forces cause no measurable deflection or spring in the tool clamping surfaces and that sufficiently high natural frequencies of the measuring system can be attained. It is further evident that the invention also can be applied to optimize machining operations by influencing feed rates and cutting speeds close to the limits set for each operation which can be achieved in an analogous manner by using the control signals to influence in a conventional manner such variables as feed rates, cutting speeds, etc.

Thus, while I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are within the scope of those skilled in the art.

I claim:

1. A supervisory device for machine tools for monitoring the operating procedures therein, comprising means for measuring the forces acting on a workpiece;

a work table supported directly on a plurality of multi-component measuring transducers each of which measures multi-component force components and vibration components acting on the workpiece, said transducers being rigidly supported on said work table;

means for electronically monitoring the force and vibration components acting on the workpiece; and means for comparing said measured components with stored predetermined values and generating control signals in response thereto.

2. A supervisory device according to claim 1, wherein the directions of sensitivity of the measurement transducers rigidly supported on said work table concide with the coordinate axes of the machine tool.

3. A supervisory device according to claim 2, wherein said multi-component measurement transducers are substantially flat and include piezoelectric crystals the sensitivities of which are oriented in different directions.

4. A supervisory device according to claim 3, wherein said comparing means includes a programming unit which receives predetermined values of the maximum permissible magnitudes of the components for a plurality of different operations and monitors the actual values of said components measured by said measurement transducers.

5. A supervisory device according to claim 4, wherein said programming unit includes means for correlating with each operation of the machine tool threshold values of the maximum force and vibration amplitudes of the measured force components and the predetermined components.

* * * * *